(12) United States Patent
Birnbrich et al.

(10) Patent No.: US 7,300,963 B2
(45) Date of Patent: Nov. 27, 2007

(54) HARDENERS FOR WATER-BASED EPOXY RESIN SYSTEMS AND PROCESSES FOR USING THE SAME

(75) Inventors: Paul Birnbrich, Solingen (DE); Thorsten Roloff, Duesseldorf (DE); Giorgio Sabbadini, Rho (IT); Hans-Josef Thomas, Korschenbroich (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 433 days.

(21) Appl. No.: 10/939,681

(22) Filed: Sep. 13, 2004

(65) Prior Publication Data

US 2005/0113553 A1    May 26, 2005

(30) Foreign Application Priority Data

Sep. 12, 2003  (DE)  ............... 103 42 502

(51) Int. Cl.
  *B32B 17/10*   (2006.01)
  *B32B 28/38*   (2006.01)
  *C08K 3/20*    (2006.01)
  *C08L 63/00*   (2006.01)
  *C08L 63/02*   (2006.01)

(52) U.S. Cl. ............... 523/403; 428/413; 428/417; 525/524

(58) Field of Classification Search ............ None
See application file for complete search history.

(56) References Cited

U.S. PATENT DOCUMENTS 4,608,405 A    8/1986   DeGooyer
5,612,394 A *  3/1997   Pfeil et al. ............ 523/403

OTHER PUBLICATIONS

CAPLUS accession No. 2000:396733 and Derwent accession No. 1996-085694 for Romanian Patent No. 109,739, Braniste et al., May 30, 1995, three pages.*

* cited by examiner

*Primary Examiner*—Robert Sellers
(74) *Attorney, Agent, or Firm*—John F. Daniels; Daniel S. Oritz

(57) ABSTRACT

Hardeners for water-based epoxy resin systems, the hardeners being obtainable by reacting a mixture of: (A) at least one epoxidized polyalkylene oxide selected from the group of epoxidized polyethylene oxides, epoxidized polypropylene oxides and polyethylene propylene oxides, (B) at least one epoxidized aromatic hydroxy compound selected from the group of bisphenol A epoxides and bisphenol F epoxides and (C) at least one aromatic hydroxy compound selected from the group of bisphenol A and bisphenol F, to form an intermediate product and subsequently reacting this intermediate product with a polyamine (E), are disclosed.

20 Claims, No Drawings

HARDENERS FOR WATER-BASED EPOXY RESIN SYSTEMS AND PROCESSES FOR USING THE SAME

BACKGROUND OF THE INVENTION

U.S. Pat. No. 4,608,405 describes hardeners for epoxy resins. These hardeners are based on epoxidized polyols containing aromatic and aliphatic structural elements, almost all the epoxy groups being reacted with a polyamine to form an intermediate product and the primary amine groups of the intermediate product subsequently being reacted with a monoepoxide or a monocarboxylic acid to form the end product. This end product is a hardener for water-based epoxy resin systems.

SUMMARY OF THE INVENTION

This invention relates to coating compositions with relatively little tendency towards shrinkage. These coating compositions are obtainable by reaction of epoxy resins and special hardeners according to the invention, these hardeners being obtainable by reacting a mixture of epoxidized polyalkylene oxide, an epoxidized aromatic hydroxy compound and an aromatic hydroxy compound to form an intermediate product and subsequently reacting this intermediate product with a polyamine.

The problem addressed by the present invention was to provide hardeners for water-based epoxy resin systems which, when used in the reaction with epoxy resins, would lead to the formation of coating compositions or coatings distinguished by a particularly low tendency to shrink. In addition, the hardeners would be self-emulsifying in water and would be capable of emulsifying added liquid epoxy resins in water or water-containing systems.

Another problem addressed by the present invention was to provide hardeners for water-based epoxy resin systems which would be distinguished by good pigment wetting behaviour.

A further problem addressed by the invention was to provide hardeners for water-based epoxy resin systems which, when used in the reaction with epoxy resins, would lead to the formation of coating compositions or coatings distinguished by a fast tack-free time.

Another problem addressed by the invention was to provide hardeners for water-based epoxy resin systems which, when used in the reaction with epoxy resins, would lead to the formation of coating compositions or coatings distinguished by a sufficiently long pot life. The end of the pot life would be reflected in a distinct increase in the viscosity of the mixture.

Another problem addressed by the invention was to provide hardeners for water-based epoxy resin systems which would form good clear lacquers with epoxy resins in thin layers.

Another problem addressed by the invention was to provide hardeners for water-based epoxy resin systems which would develop distinct hardness after a short drying time.

It has now surprisingly been found that coating compositions obtainable by reaction of epoxy resins and special hardeners—these hardeners being obtainable by reacting a mixture of epoxidized polyalkylene oxides, epoxidized aromatic hydroxy compounds and aromatic hydroxy compounds to form an intermediate product and subsequently reacting this intermediate product with polyamine—satisfy these requirements excellently in every respect.

In a first embodiment, the present invention relates to hardeners for water-based epoxy resin systems, these hardeners being obtainable by reacting a mixture of (A) at least one epoxidized polyalkylene oxide selected from the group of epoxidized polyethylene oxides, epoxidized polypropylene oxides and polyethylene propylene oxides, (B) at least one epoxidized aromatic hydroxy compound selected from the group of bisphenol A epoxides and bisphenol F epoxides and (C) at least one aromatic hydroxy compound selected from the group of bisphenol A and bisphenol F to form an intermediate product and subsequently reacting this intermediate product with a polyamine (E).

With the quite outstanding properties of the hardeners according to the invention in mind, attention is drawn to the following:

The shrinkage tendency of the cured compositions obtainable using the hardeners according to the invention and epoxy resins, as measured in floor coating compositions at 23° C./50% relative air humidity in accordance with Table 2 of the Examples of the present application, is less than 3%, preferably less than 1.8% and more particularly less than 0.9%.

Pigment wetting where the hardeners according to the invention are used is such that a ratio of filler to binder above 4.1:1 is achieved in floor coating compositions as described in Table 2 of the Examples of the present application.

Lacquers obtainable using the hardeners according to the invention and epoxy resins are clear and colorless in layer thicknesses of up to 0.3 mm. Accordingly, good clear lacquers are obtainable in layer thicknesses of up to 0.3 mm using the hardeners according to the invention.

The tack-free time of clear lacquers obtainable using the hardeners according to the invention is excellent. Three hours after the application of clear lacquers corresponding to the clear lacquer formulations of Table 1 of the Examples of the present application at room temperature, small glass balls or glass dust scattered onto the lacquer film no longer adhere to the lacquer film and can readily be removed with a paint brush.

The pot lives of clear lacquers obtainable using the hardeners according to the invention are excellent. With clear lacquer formulations based on the hardeners of Table 1 of the Examples of the present application, the clear lacquer can still readily be applied after 45 minutes, a clear, colorless transparent lacquer being obtained. The end of the pot life is characterized by a distinct increase in the viscosity of the mixture and is clearly reflected in the fact that the viscosity increases by more than three-fold relative to the initial viscosity.

Cured compositions obtainable using the hardeners and epoxy resins according to the invention have the property whereby, after drying for only 1 day at 20° C., 0.1 mm thick lacquer films corresponding to the formulations of Table 1 of the Examples of the present application have a König pendulum hardness (DIN 53157) of more than 170.

The hardness development of the cured compositions obtainable using the hardeners according to the invention and epoxy resins, as measured in floor coating compositions according to Table 2 of the Examples of the present application, is equivalent to a Shore D hardness (as measured to DIN 53505) of >40 after curing for 3 days at 8° C.

The present invention also relates to the use of the hardeners according to the invention for the production of clear lacquers, coating compositions and the like.

DETAILED DESCRIPTION OF THE INVENTION

Compounds (A)

In the context of the present invention, epoxidized polyethylene oxides are understood to be compounds which can be obtained by converting the two terminal OH groups of polyethylene oxide into oxirane groups, for example by reaction with epichlorohydrin. The polyethylene oxide used may have an average molecular weight of 80 to 3,000 and may be produced by starting the polymerization of the ethylene oxide with a $C_{2-18}$ alkylene diol, as known to the expert.

In the context of the invention, epoxidized polypropylene oxides are understood to be compounds which can be obtained by converting the two terminal OH groups of polypropylene oxide into oxirane groups, for example by reaction with epichlorohydrin. The polypropylene oxide used may have an average molecular weight of 110 to 3,000 and may be produced by starting the polymerization of the propylene oxide with a $C_{2-18}$ alkylene diol, as known to the expert.

In the context of the invention, polyethylene propylene oxides are understood to be compounds which can be obtained by converting the two terminal OH groups of polyethylene propylene oxide into oxirane groups, for example by reaction with epichlorohydrin. The polyethylene propylene oxide used may have an average molecular weight of 80 to 3,000. Polyethylene propylene oxides are compounds obtainable by copolymerization of ethylene and propylene oxide, the polymerization of the two reactants being carried out simultaneously or blockwise by starting the polymerization of the propylene oxide and/or the ethylene oxide with a $C_{2-18}$ alkylene diol, as known to the expert.

The compounds (A) may be used individually or in the form of mixtures with one another.

Compounds (B)

In the context of the invention, bisphenol A epoxides are as always understood to be compounds obtainable by reacting bisphenol A with epichlorohydrin and/or polymerizing it by further reaction with bisphenol A. Accordingly, these compounds are also known as bisphenol A diglycidyl ethers or, generally, as epoxy resins. Commercially available products are Epikote 828, 1001, 1002, 1003, 1004 (Shell).

The molecular weights of the bisphenol A epoxides used are preferably in the range from 380 to 3,000.

In the context of the invention, bisphenol F epoxides are as always understood to be compounds obtainable by reacting bisphenol F with epichlorohydrin and/or polymerizing it by further reaction with bisphenol F. Accordingly, these compounds are also known as bisphenol F diglycidyl ethers or, generally, as bisphenol F epoxy resins.

The molecular weights of the bisphenol F epoxides used are preferably in the range from 350 to 3,000.

The compounds (B) may be used individually or in the form of mixtures with one another.

Compounds (C)

Bisphenol A is known to the expert and is characterized by the following formula:

Bisphenol A

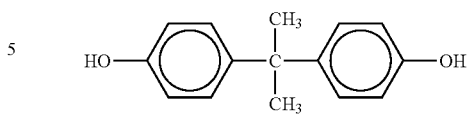

Bisphenol F is also known to the expert.

The compounds (C) may be used individually or in the form of mixtures with one another.

Compounds (D)

In another embodiment, the compounds (D) are used in addition to the compounds (A), (B) and (C) for the production of the intermediate product which is subsequently reacted with the polyamines (E) to form the hardener. The compounds (D) are compounds from the group of triglycidyl ethers of triols and diglycidyl ethers of diols. The following are mentioned as examples of suitable diols and triols on which the compounds (D) are based: ethylene glycol, diethylene glycol, triethylene glycol, 1,2-propylene glycol, 1,3-propylene glycol, 1,4-butylene glycol, pentane-1,5-diol, hexane-1,6-diol, cyclohexane diol, cyclohexane dimethanol, neopentyl glycol, hexane-1,2,6-triol, glycerol and trimethylol propane.

The compounds (D) may be used individually or in the form of mixtures with one another.

In the interests of clarity, it is pointed out that, accordingly, the present invention also relates to hardeners for water-based epoxy resin systems, these hardeners being obtainable by reacting a mixture of (A) at least one epoxidized polyalkylene oxide selected from the group of epoxidized polyethylene oxides, epoxidized polypropylene oxides and polyethylene propylene oxides, (B) at least one epoxidized aromatic hydroxy compound selected from the group of bisphenol A epoxides and bisphenol F epoxides, (C) at least one aromatic hydroxy compound selected from the group of bisphenol A and bisphenol F and (D) at least one compound selected from the group of triglycidyl ethers of triols and diglycidyl ethers of diols to form an intermediate product and subsequently reacting this intermediate product with a polyamine (E).

Compounds (E)

The polyamines used in accordance with the present invention are primary and/or secondary amines containing at least two nitrogen atoms and at least two active amino hydrogen atoms per molecule. Aliphatic, aromatic, aliphatic-aromatic, cycloaliphatic and heterocyclic di- and polyamines may be used. The following are examples of suitable polyamines (E): polyethylene amines (ethylene diamine, diethylene triamine, triethylene tetramine, tetraethylene pentamine, etc.), 1,2-propylene diamine, 1,3-propylene diamine, 1,4-butane diamine, 1,5-pentane diamine, 1,3-pentane diamine, 1,6-hexane diamine, 3,3,5-trimethyl-1,6-hexanediamine, 3,5,5-trimethyl-1,6-hexane diamine, 2-methyl-1,5-pentane diamine, bis-(3-aminopropyl)-amine, N,N'-bis-(3-aminopropyl)-1,2-ethane diamine, N-(3-aminopropyl)-1,2-ethane diamine, 1,2-diaminocyclohexane, 1,3-diaminocyclohexane, 1,4-diaminocyclohexane, aminoethyl piperazines, the poly(alkylene oxide)diamines and triamines (such as, for example, Jeffamine D-230, Jeffamine D-400, Jeffamine D-2000, Jeffamine D-4000, Jeffamine T-403, Jeffamine EDR-148, Jeffamine EDR-192, Jeffamine C-346, Jeffamine ED-600, Jeffamine ED-900, Jeffamine ED-2001), meta-xylene diamine, phenylene diamine, 4,4'-diaminodiphenyl methane, toluene diamine, isophorone diamine, 3,3'-dimethyl-4,4'-diaminodicyclohexyl methane, 4,4'-diaminodicyclohexyl-methane, 2,4'-diaminodicyclohexyl methane, 1,3-bis-(aminomethyl)-cyclohexane, the mixture of poly(cyclohexylaromatic)amines attached by a methylene bridge (also known as MBPCAA) and polyaminoamides. Polyethylene amines, especially diethylene triamine, are particularly preferred.

The compounds (E) may be used individually or in admixture with one another.

Production of the Intermediate Product

In one embodiment, compounds (A) and (B) are used in a molar ratio of 0.1:1 to 5:1 in the production of the intermediate product.

In another embodiment, a molar ratio of the sum of compounds (A) and (B) (these compounds each contain two oxirane groups per molecule) to compound (C) (this compound contains two OH groups per molecule) of 1.1:1 to 10:1 is adjusted in the production of the intermediate product. In other words, the equivalent ratio of oxirane rings in the sum of compounds (A) and (B) to reactive hydrogen atoms in compound (C) is adjusted to a value of 1.1:1 to 10:1.

In another embodiment, namely in cases where at least one compound (D) is also used in the production of the hardener, a molar ratio of the sum of compounds (A), (B) and (D) (these compounds each contain two oxirane groups per molecule) to compound (C) (this compound contains two OH groups per molecule) of 1.1:1.0 to 10.0:1.0 is adjusted in the production of the intermediate product. In other words, the equivalent ratio of oxirane rings in the sum of compounds (A), (B) and (D) to reactive hydrogen atoms in compound (C) is adjusted to a value of 1.1:1.0 to 10.0:1.0.

In the interests of clarity, the following explanation is offered: The expression "equivalent ratio" is familiar to the expert. The basic concept behind the notion of the equivalent is that, for every substance participating in a reaction, the reactive groups involved in the desired reaction are taken into consideration. By indicating an equivalent ratio, it is possible to express the ratio which all the various reactive groups of the compounds (x) and (y) used bear to one another. It is important in this connection to bear in mind that a reactive group is understood to be the smallest possible reactive group, i.e. the notion of the reactive group is not identical with the notion of the functional group. In the case of H-acid compounds, this means for example that, although OH groups or NH groups represent such reactive groups, $NH_2$ groups with two reactive H atoms positioned at the same nitrogen atom do not. In their case, the two hydrogen atoms within the functional group $NH_2$ are appropriately regarded as reactive groups so that the functional group $NH_2$ contains two reactive groups, namely the hydrogen atoms.

In one embodiment, the production of the intermediate product is carried out in the presence of a catalyst, more particularly triphenyl phosphine or ethyl triphenyl phosphoniumn iodide. The catalyst is used in a quantity of about 0.01 to 1.0% by weight, based on the total quantity of compounds (A), (B) and (C). The epoxy value (% EpO) of the intermediate product is preferably below 10% EpO and more particularly below <5% EpO. The definition of epoxy value and information on its analytical determination can be found in the Examples of the present application.

Production of the Hardener

As already mentioned, the hardener is produced by reacting the intermediate product with a polyamine (E).

In one embodiment, the intermediate product and the polyamine (E) are used in such quantities that the equivalent ratio of the reactive H atoms at the aminonitrogen atoms of (E) to the oxirane groups in the intermediate compound is in the range from 4:1 to 100:1.

The reaction of the intermediate product with the polyamine is preferably carried out by initially introducing the polyamine in excess so as to ensure that essentially 1 molecule of the polyamine, preferably diethylene triamine, reacts with one of the epoxy groups of the intermediate compound. Excess amine can be distilled off to keep the free amine content as low as possible.

Production of Coating Compositions

The present invention also relates to a process for the production of clear lacquers, coating compositions and the like which are obtainable by combining and reacting the above-mentioned hardeners according to the invention with epoxy compounds (F) while stirring in an aqueous medium.

The epoxy compounds (F) are polyepoxides containing on average at least two terminal or lateral epoxy groups per molecule. These epoxy compounds may be both saturated and unsaturated and aliphatic, cycloaliphatic, aromatic and heterocyclic and may also contain hydroxyl groups. They may also contain substituents which do not cause any troublesome secondary reactions under the mixing and reaction conditions, for example alkyl or aryl substituents, ether groups and the like. These epoxy compounds are preferably polyglycidyl ethers based on polyhydric, preferably dihydric, alcohols, phenols, hydrogenation products of these phenols and/or novolaks (reaction products of mono- or polyhydric phenols with aldehydes, more particularly formaldehyde, in the presence of acidic catalysts). The epoxy equivalent weights of these epoxy compounds are preferably between 160 and 3,200 and more preferably between 170 and 830. The epoxy equivalent weight of a substance is the quantity of the substance (in grams) which contains 1 mole of oxirane rings.

Preferred polyhydric phenols are the following compounds: resorcinol, hydroquinone, 2,2-bis-(4-hydroxyphenyl)-propane (bisphenol A), isomer mixtures of dihydroxydiphenyl methane (bisphenol F), tetrabromobisphenol A, 4,4'-dihydroxydiphenyl cyclohexane, 4,4'-dihydroxy-3,3-dimethyldiphenyl propane, 4,4'-dihydroxydiphenyl, 4,4'-dihydroxybenzophenol, bis-(4-hydroxyphenyl)-1,1-ethane, bis-(4-hydroxyphenyl)-1,1-isobutane, bis-(4-hydroxyphenyl)-methane, bis-(4-hydroxyphenyl)-ether, bis-(4-hydroxyphenyl)-sulfone etc. and the chlorination and bromination products of the above-mentioned compounds. Bisphenol A is most particularly preferred.

The polyglycidyl ethers of polyhydric alcohols are also suitable compounds (F). Examples of such polyhydric alcohols are ethylene glycol, diethylene glycol, triethylene glycol, 1,2-propylene glycol, polyoxypropylene glycols (n=1-20), 1,3-propylene glycol, 1,4-butylene glycol, pentane-1,5-diol, hexane-1,6-diol, hexane-1,2,6-triol, glycerol and bis-(4-hydroxycyclohexyl)-2,2-propane.

Other suitable compounds (F) are polyglycidyl ethers of polycarboxylic acids obtained by reaction of epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid.

Examples are adipic acid diglycidyl ester, phthalic acid diglycidyl ester and hexahydrophthalic acid diglycidyl ester.

Mixtures of several epoxy compounds (F) may also be used.

In addition, additives and/or processing aids known to the relevant expert may be used in the production of coating compositions where, as mentioned above, the hardeners according to the invention are reacted with epoxy compounds (F) in aqueous medium. Examples include pigments, cement, gravel, deaerators, defoamers, dispersion aids, anti-sedimenting agents, accelerators, free amines, flow control additives, conductivity improvers.

So far as the layer thickness of the coating compositions is concerned, the hardeners according to the invention may be used in coating compositions for layer thicknesses of 0.01 to 10 mm and preferably for layer thicknesses of 0.05 to 3 mm.

In addition, the very slight tendency towards shrinkage of the cured compositions achieved by the use of the hardeners to be used in accordance with the invention can be further reduced by adjusting a high pigment content.

The present invention also relates to the cured compositions obtainable by reacting the above-mentioned hardeners according to the invention with epoxy compounds (F) in aqueous medium and then curing the resulting product.

In one embodiment, the cured compositions are floor coatings. In a preferred embodiment, these floor coatings have a longitudinal shrinkage of less than 3% in a layer thickness of more than 0.4 mm (as measured at 23° C./50% relative air humidity).

EXAMPLES

Measurement Methods

Epoxy value (% EpO)

The content of oxirane groups ("epoxy groups") in compounds was characterized by epoxy titration. The epoxy value (% EpO) obtained indicates how many grams oxirane oxygen are present in 100 grams of a sample.

Titration is Based on the Following Principle:

A solution containing excess tetraethyl ammonium bromide is added to the sample containing oxirane rings. The mixture is then titrated with a solution of perchloric acid in glacial acetic acid, an equimolar quantity of hydrogen bromide being released. The hydrogen bromide reacts with the oxirane rings in a ring opening reaction and forms the corresponding bromohydrin.

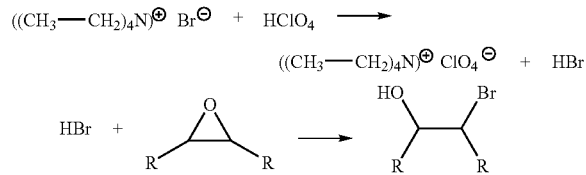

Crystal violet is used as the indicator. The determination presupposes the absence of water, bases and amines.

The following reagents were used: (1) 0.1 N perchloric acid (Merck) in glacial acetic acid; (2) tetraethyl ammonium bromide (Fluka) in the form of a solution of 100 g tetraethyl ammonium bromide in 400 ml glacial acetic acid; (3) crystal violet (Merck); the indicator solution was prepared by dissolving 0.2 g crystal violet in 100 ml glacial acetic acid.

Procedure: 0.2 to 0.5 g of the sample containing oxirane rings is placed in an Erlenmeyer flask. The sample is dissolved in 50 ml water-free acetone. 10 ml tetraethyl ammonium bromide solution (see above) and 3 drops crystal violet solution (see above) are then added. The mixture is titrated with a 0.1 N solution of perchloric acid in glacial acetic acid. The end point is reached when the color changes from blue to green. The actual titration is preceded by a blank test (no oxirane compound present) to rule out measurement errors.

Evaluation: The epoxy content % EpO is calculated as follows:

$$\% \ EpO = [(a-b) \times 0.160]/E$$

where
a=milliliters 0.1 n $HClO_4$ solution required for titration,
b=milliliters 0.1 n $HClO_4$ solution needed in the blank test,
E=weight of sample in grams Epoxy Equivalent Weight (EEW)

The epoxy equivalent weight (EEW) can be calculated as follows from the epoxy value:

$$16 \times 100 / \% \ EpO = EEW$$

The EEW is expressed in g/eq.

Abbreviations

The abbreviations used in the following have the following meanings:
EEW: epoxy equivalent weight (as described above)
MW: average molecular weight Example 1

44 g poly(propyleneglycol)digycidyl ether (EEW 326, MW 652) were mixed at 20° C. with 46.2 g bisphenol A diglycidyl ether (Chemres E20, Cognis, EEW 194), 14.0 g bisphenol A and 0.1 g triphenylphosphine. The mixture obtained was heated to 160° C. and stirred at that temperature for ca. 3.5 hours until the epoxy value was 3.95%. The mixture was then cooled to 60° C. and 121.4 g diethylene triamine were added at that temperature. After the exothermic reaction had abated, the reaction mixture was re-heated for 2 hours to 160° C. The excess of diethylene triamine was distilled off in vacuo (up to 200° C. bottom temperature, pressures below 10 mbar) until no more free amine distilled over. The mixture was then cooled to 90° C., after which 89.5 g water were added with thorough stirring.

205.6 g of a clear amber-colored liquid with a Brookfield viscosity as such (10 r.p.m., 40° C.) of 2140 mPas and an amine value of 134 were obtained.

Example 2

44 g poly(propyleneglycol)digycidyl ether (EEW 326, MW 652) were mixed at 20° C. with 46.2 g bisphenol A diglycidyl ether (Chemres E20, Cognis, EEW 194), 14.0 g bisphenol A and 0.1 g triphenylphosphine. The mixture obtained was heated to 160° C. and stirred at that temperature for ca. 9 hours until the epoxy value was 3.81%. The mixture was then cooled to 60° C. and 121.4 g diethylene triamine were added at that temperature. After the exothermic reaction had abated, the reaction mixture was re-heated for 2 hours to 160° C. The excess of diethylene triamine was distilled off in vacuo (up to 200° C. bottom temperature, pressures below 10 mbar) until no more free amine distilled over. The mixture was then cooled to 90° C., after which 89.5 g water were added with thorough stirring.

202.3 g of a clear amber-colored liquid with a Brookfield viscosity as such (10 r.p.m., 40° C.) of 2110 mPas were obtained.

Example 3

44 g poly(propyleneglycol)digycidyl ether (EEW 326, MW 652) were mixed at 20° C. with 46.2 g bisphenol A diglycidyl ether (Chemres E20, Cognis, EEW 194), 14.0 g bisphenol A and 0.1 g triphenylphosphine. The mixture obtained was heated to 160° C. and stirred at that temperature for ca. 5 hours until the epoxy value was 4.12%. The mixture was then cooled to 60° C. and 121.4 g diethylene triamine were added at that temperature. After the exothermic reaction had abated, the reaction mixture was re-heated for 2 hours to 160° C. The excess of diethylene triamine was distilled off in vacuo (up to 200° C. bottom temperature, pressures below 10 mbar) until no more free amine distilled over. The mixture was then cooled to 90° C., after which 90.5 g water were added with thorough stirring.

209.2 g of a clear brown-yellow liquid with a Brookfield viscosity as such (10 r.p.m., 40° C.) of 1440 mPas were obtained.

Example 4

34.4 g poly(propyleneglycol)digycidyl ether (EEW 326, MW 652) were mixed at 20° C. with 46.2 g bisphenol A diglycidyl ether (Chemres E20, Cognis, EEW 194), 14.0 g bisphenol A, 8.9 g butanediol diglycidyl ether (EEW 132) and 0.1 g triphenylphosphine. The mixture obtained was heated to 160° C. and stirred at that temperature for 2 hours until the epoxy value was 4.39%. The mixture was then cooled to 60° C. and 121.4 g diethylene triamine were added at that temperature. After the exothermic reaction had abated, the reaction mixture was re-heated for 2 hours to 160° C. The excess of diethylene triamine was distilled off in vacuo (up to 200° C. bottom temperature, pressures below 10 mbar) until no more free amine distilled over. The mixture was then cooled to 90° C., after which 91.7 g water were added with thorough stirring.

211.9 g of a clear, light yellow liquid with a Brookfield viscosity as such (10 r.p.m., 40° C.) of 2500 mPas were obtained.

Example 5

34.4 g poly(propyleneglycol)digycidyl ether (EEW 326, MW 652) were mixed at 20° C. with 46.2 g bisphenol A diglycidyl ether (Chemres E20, Cognis, EEW 194), 14.0 g bisphenol A, 10.7 g hexanediol diglycidyl ether (EEW 159.1) and 0.1 g triphenylphosphine. The mixture obtained was heated to 160° C. and stirred at that temperature for 2 hours until the epoxy value was 4.37%. The mixture was then cooled to 60° C. and 121.4 g diethylene triamine were added at that temperature. After the exothermic reaction had abated, the reaction mixture was re-heated for 2 hours to 160° C. The excess of diethylene triamine was distilled off in vacuo (up to 200° C. bottom temperature, pressures below 10 mbar) until no more free amine distilled over. The mixture was then cooled to 90° C., after which 93.0 g water were added with thorough stirring.

215.1 g of a clear, light yellow liquid with a Brookfield viscosity as such (10 r.p.m., 40° C.) of 2080 mPas were obtained.

Comparison Example 1

27.0 g polypropylene oxide monoamine (Jeffamine M 600, Huntsman, MW 600) were mixed at 20° C. with 4.4 g monoaminopolyethylene oxide (Jeffamine M 2070, Huntsman, MW 2000), 46.2 g bisphenol A diglycidyl ether (Chemres E20, Cognis, EEW 194), 14.0 g bisphenol A, 42.9 g butanediol diglycidyl ether (EEW 132) and 0.1 g triphenylphosphine. The mixture obtained was heated to 160° C. and stirred at that temperature for 2 hours until the epoxy value was 4.53%. The mixture was then cooled to 60° C. and 121.4 g diethylene triamine were added at that temperature. After the exothermic reaction had abated, the reaction mixture was re-heated for 2 hours to 160° C. The excess of diethylene triamine was distilled off in vacuo (up to 200° C. bottom temperature, pressures below 10 mbar) until no more free amine distilled over. The mixture was then cooled to 90° C., after which 116.0 g water were added with thorough stirring. 266.8 g of a clear, amber-colored liquid with a Brookfield viscosity as such (10 r.p.m., 40° C.) of 2100 mPas were obtained.

Performance Tests

1. Clear Lacquer Properties

The hardeners of Examples 1 to 5 (hardener 60% in water) and Comparison Example 1 (hardener 60% in water) were made up into a clear lacquer by mixing the quantities shown in Table 1 of components Nos. 1 to 3 (the numbering of components Nos. 1 to 3 used appears in the first column of Table 1).

To this end, components No. 1 (epoxy resin) and No. 2 (hardener 60% in water) were thoroughly mixed with component No. 3 (water) in a glass beaker by stirring manually with a wooden spatula until a homogeneous emulsion had formed. The emulsion was then applied by coating knife (0.1 mm) to a pane of glass and left to cure at 20° C. After one day and seven days, the König pendulum hardness (DIN 53157) was determined with an Erichsen type 299 pendulum hardness tester.

In every case, the end of the pot life was reflected in a distinct increase in the viscosity of the emulsion to more than 3 times its initial viscosity. The pot life was ca. 60 minutes in every case. The lacquers obtained were clear and colorless. The tack-free time (time after which small glass balls or glass dust no longer adhere to the film, cf. also definition in the description of the present application) was ca. 1 hour in every case.

TABLE 1

| | | Clear lacquer formulations | | | | | |
|---|---|---|---|---|---|---|---|
| No. | Properties/Test | E1 | E2 | E3 | E4 | E5 | C1 |
| 1 | Lacquer Chemres E30 (g) | 10 | 10 | 10 | 10 | 10 | 10 |

TABLE 1-continued

Clear lacquer formulations

| No. | Properties/Test | E1 | E2 | E3 | E4 | E5 | C1 |
|---|---|---|---|---|---|---|---|
| 2 | Hardener 60% in water (g) | 11.2 | 11.2 | 10.6 | 9.4 | 9.5 | 11.2 |
| 3 | Water (g) | 9.1 | 9.0 | 9.0 | 8.5 | 9.5 | 9.0 |
|  | König pendulum hardness after 1 day (0.1 mm film) | 209 | 204 | 184 | 193 | 191 | 169 |
|  | König pendulum hardness after 7 days (0.1 mm film) | 218 | 211 | 193 | 205 | 202 | 188 |

The column headings E1, E2, etc. in the first line of Table 1 have the following meanings:

E1 means that the clear lacquer formulation of column E1 contained the compound of Example 1 as component No. 2 (hardener).

E2 means that the clear lacquer formulation of column E2 contained the compound of Example 2 as component No. 2 (hardener).

E3 means that the clear lacquer formulation of column E3 contained the compound of Example 3 as component No. 2 (hardener).

E4 means that the clear lacquer formulation of column E4 contained the compound of Example 4 as component No. 2 (hardener).

E5 means that the clear lacquer formulation of column E5 contained the compound of Example 5 as component No. 2 (hardener).

C1 means that the clear lacquer formulation of column C1 contained the compound of Comparison Example 1 as component No. 2 (hardener).

The figures in columns E1, E2, etc. represent quantities in grams based on the components used.

2. Floor Coating Composition for Determining Shrinkage

The hardeners of Examples 1 to 5 (hardener 60% in water) and Comparison Example 1 (hardener 60% in water) were mixed with the liquid components (components Nos. 6, 7, 8, 9 and 10) in the quantities shown in Table 2 and homogenized using a Pendraulik stirrer. The pigments (components Nos. 2, 3, 4, 5 and 11) were then successively stirred in homogeneously and dispersed for ca. 20 minutes with the Pendraulik stirrer.

Components Nos. 12 and 13 were then added to the mixture, followed by homogenization for ca. 4 minutes with the Pendraulik stirrer.

The numbering of components Nos. 1 to 13 used in the formulations appears in the first column of Table 2.

Foammaster® 223 was used as component No. 6. This product is a defoamer (Cognis).

Loxanol® DPN was used as component No. 7. This product is an open-time extender (Cognis).

Dowanol® TPM was used as component No. 8. This product is an auxiliary solvent (Cognis).

DSX® 1550 was used as component No. 9. This product is a thickener (Cognis).

Chemres® E95 was used as component No. 12. This product is an epoxy resin (Cognis).

In every case, a constant ratio of filler to binder of 4.2:1 was adjusted. To measure longitudinal shrinkage, the floor coating formulation obtained was poured into a prefabricated Teflon mold (length 150 mm, width 20 mm, depth 3 mm) and left to cure in a conditioning cabinet at 23° C./50% relative air humidity. The longitudinal shrinkage was determined by slide rule after 7, 14 and 28 days and was expressed as a percentage reduction, based on the original length of 50 mm.

TABLE 2

Shrinkage of floor coating compositions

| No. | Constituents/Example | E1 | E2 | E3 | E4 | E5 | C1 |
|---|---|---|---|---|---|---|---|
| 1 | Hardener 60% in water | 21.8 | 21.8 | 21.2 | 19.7 | 19.7 | 21.8 |
| 2 | Heucosin-Grau G 1978 | 9.5 | 9.5 | 9.5 | 9.5 | 9.5 | 9.5 |
| 3 | Heavy spar C14 | 16.3 | 16.3 | 16.3 | 16.3 | 16.3 | 16.3 |
| 4 | Minex S20 | 16.3 | 16.3 | 16.3 | 16.3 | 16.3 | 16.3 |
| 5 | Bentone EW | 2.0 | 2.0 | 2.0 | 2.0 | 2.0 | 2.0 |
| 6 | Foammaster ® 223 | 0.3 | 0.3 | 0.3 | 0.3 | 0.3 | 0.3 |
| 7 | Loxanol ® DPN | 0.6 | 0.6 | 0.6 | 0.6 | 0.6 | 0.6 |
| 8 | Dowanol ® TPM | 0.6 | 0.6 | 0.6 | 0.6 | 0.6 | 0.6 |
| 9 | DSX ® 1550 | 0.3 | 0.3 | 0.3 | 0.3 | 0.3 | 0.3 |
| 10 | Water | 10.0 | 10.0 | 10.0 | 10.0 | 10.0 | 10.0 |
|  | Sum base-paint | 77.8 | 77.8 | 77.1 | 75.7 | 75.7 | 77.8 |
| 11 | Silica sand | 100 g | 100 | 100 | 100 | 100 | 100 |
|  | Sum | 177.8 | 177.8 | 177.1 | 175.7 | 175.7 | 177.8 |
| 12 | Chemres ® E95 (EEW 190) | 20.7 | 20.7 | 21.2 | 22.0 | 22.0 | 20.7 |
| 13 | Water | 10.5 | 10.5 | 10.7 | 11.3 | 11.3 | 10.5 |
|  | Total sum | 209.0 | 209.0 | 209.0 | 209.0 | 209.0 | 209.0 |
|  | % water in the formulation | 14.0 | 14.0 | 14.0 | 14.0 | 14.0 | 14.0 |
|  | Sum fillers (Nos. 2, 3, 4, 5) | 142.2 | 142.2 | 142.2 | 142.2 | 142.2 | 142.2 |

TABLE 2-continued

Shrinkage of floor coating compositions

| No. | Constituents/Example | E1 | E2 | E3 | E4 | E5 | C1 |
|---|---|---|---|---|---|---|---|
| | Sum binders (sum of No. 1 without water and No. 12) | 33.8 | 33.8 | 33.8 | 33.8 | 33.8 | 33.8 |
| | Filler:binder ratio | 4.2 | 4.2 | 4.2 | 4.2 | 4.2 | 4.2 |
| | Shrinkage after 7 days (%) | 0.0 | — | 0.4 | 0.00 | 0.00 | 0.07 |
| | Shrinkage after 14 days | 0.13 | 0.27 | 0.4 | 0.47 | 0.27 | 3.46 |
| | Shrinkage after 28 days (%) | 0.13 | 0.27 | 0.47 | 0.47 | 0.40 | 4.79 |

The column headings E1, E2, etc. in the first line of Table 2 have the same meanings as defined for Table 1:

E1 means that the clear lacquer formulation of column E1 contained the compounds of Example 1 as component No. 1 (hardener). E2 means that the clear lacquer formulation of column E2 contained the compound of Example 2 as component No. 1 (hardener), etc.

The figures in columns E1, E2, etc. represent quantities in grams based on the components used and the balance lines "sum base-paint", "sum" and "total sum").

In addition, the following data were measured for the formulation of column E1 of Table 2:

a) (Longitudinal) shrinkage at 8° C./70% relative air humidity: this shrinkage amounted to 1.7% after 7 days and to 2.1% after 28 days.

b) Shore D hardness (measured to DIN 53505 at 8° C./70% relative air humidity): it amounted to 52 after 3 days, to 61 after 4 days, to 74 after 7 days and to 87 after 28 days.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A hardener for water-based epoxy resin systems, the hardener prepared by a process comprising:
   (a) reacting a mixture comprised of: (A) at least one epoxidized polyalkylene oxide selected from the group of epoxidized polyethylene oxides, epoxidized polypropylene oxides, epoxidized polyethylene propylene oxides and mixtures thereof; (B) at least one epoxidized aromatic hydroxy compound selected from the group of bisphenol A epoxides, bisphenol F epoxides and mixtures thereof; and (C) at least one aromatic hydroxy compound selected from the group of bisphenol A, bisphenol F and mixtures thereof, to form an intermediate product; and
   (b) introducing an excess amount of polyamine (E) sufficient for the reaction of 1 molecule of polyamine with each epoxy group in the intermediate product, and reacting the intermediate product with the polyamine.

2. The hardener according to claim 1, wherein the mixture further comprises (D) at least one compound selected from the group consisting of triglycidyl ethers of triols, diglycidyl ethers of diols and mixtures thereof.

3. The hardener according to claim 1, wherein the at least one polyamine comprises diethylene triamine.

4. The hardener according to claim 2, wherein the at least one polyamine comprises diethylene triamine.

5. The hardener according to claim 1, wherein the at least one epoxidized polyalkylene oxide comprises an epoxidized polypropylene oxide.

6. The hardener according to claim 2, wherein the at least one epoxidized polyalkylene oxide comprises an epoxidized polypropylene oxide.

7. The hardener according to claim 3, wherein the at least one epoxidized polyalkylene oxide comprises an epoxidized polypropylene oxide.

8. The hardener according to claim 4, wherein the at least one epoxidized polyalkylene oxide comprises an epoxidized polypropylene oxide.

9. The hardener according to claim 1, wherein the at least one epoxidized aromatic hydroxy compound comprises a bisphenol A epoxide.

10. The hardener according to claim 2, wherein the at least one epoxidized aromatic hydroxy compound comprises a bisphenol A epoxide.

11. The hardener according to claim 3, wherein the at least one epoxidized aromatic hydroxy compound comprises a bisphenol A epoxide.

12. The hardener according to claim 5, wherein the at least one epoxidized aromatic hydroxy compound comprises a bisphenol A epoxide.

13. The hardener according to claim 6, wherein the at least one epoxidized aromatic hydroxy compound comprises a bisphenol A epoxide.

14. The hardener according to claim 1, wherein the at least one aromatic hydroxy compound comprises bisphenol A.

15. The hardener according to claim 2, wherein the at least one aromatic hydroxy compound comprises bisphenol A.

16. The hardener according to claim 3, wherein the at least one aromatic hydroxy compound comprises bisphenol A.

17. The hardener according to claim 9, wherein the at least one aromatic hydroxy compound comprises bisphenol A.

18. A hardener for water-based epoxy resin systems, the hardener prepared by a process comprising:
   (a) reacting a mixture comprised of: (A) an epoxidized polypropylene oxides; (B) a bisphenol A epoxide; (C) bisphenol A; and (D) at least one compound selected from the group consisting of triglycidyl ethers of triols, diglycidyl ethers of diols and mixtures thereof, to form an intermediate product; and
   (b) introducing an excess amount of polyamine (E) sufficient for the reaction of 1 molecule of polyamine with each epoxy group in the intermediate product, and reacting the intermediate product with the polyamine.

19. A process for producing a coating composition, said process comprising:
   (a) providing a hardener prepared by a process comprising: (i) reacting a mixture comprised of: (A) at least one epoxidized polyalkylene oxide selected from the group of epoxidized polyethylene oxides, epoxidized polypropylene oxides, epoxidized polyethylene propylene oxides and mixtures thereof; (B) at least one epoxidized aromatic hydroxy compound selected from the group of bisphenol A epoxides, bisphenol F epoxides and mixtures thereof; and (C) at least one aromatic hydroxy compound selected from the group of bisphenol A, bisphenol F and mixtures thereof, to form an intermediate product; and (ii) reacting the intermediate product with (E) at least one polyamine; and (b) introducing an excess amount of polyamine (E) sufficient for the reaction of 1 molecule of polyamine with each epoxy group in the intermediate product, and reacting the intermediate product with the polyamine.

20. A cured coating composition prepared by a process comprising: (a) providing a coating composition prepared by the process according to claim 19 on a substrate; and (b) curing the composition; wherein the cured coating composition has a longitudinal shrinkage of less than 3% in a layer thickness of more than 0.4 mm, as measured at 23° C./50% relative air humidity.

* * * * *